Dec. 19, 1939.　　　　　L. C. PAGEL　　　　2,184,002
PROCESS FOR THE MANUFACTURE OF CASEIN
Filed Aug. 29, 1938
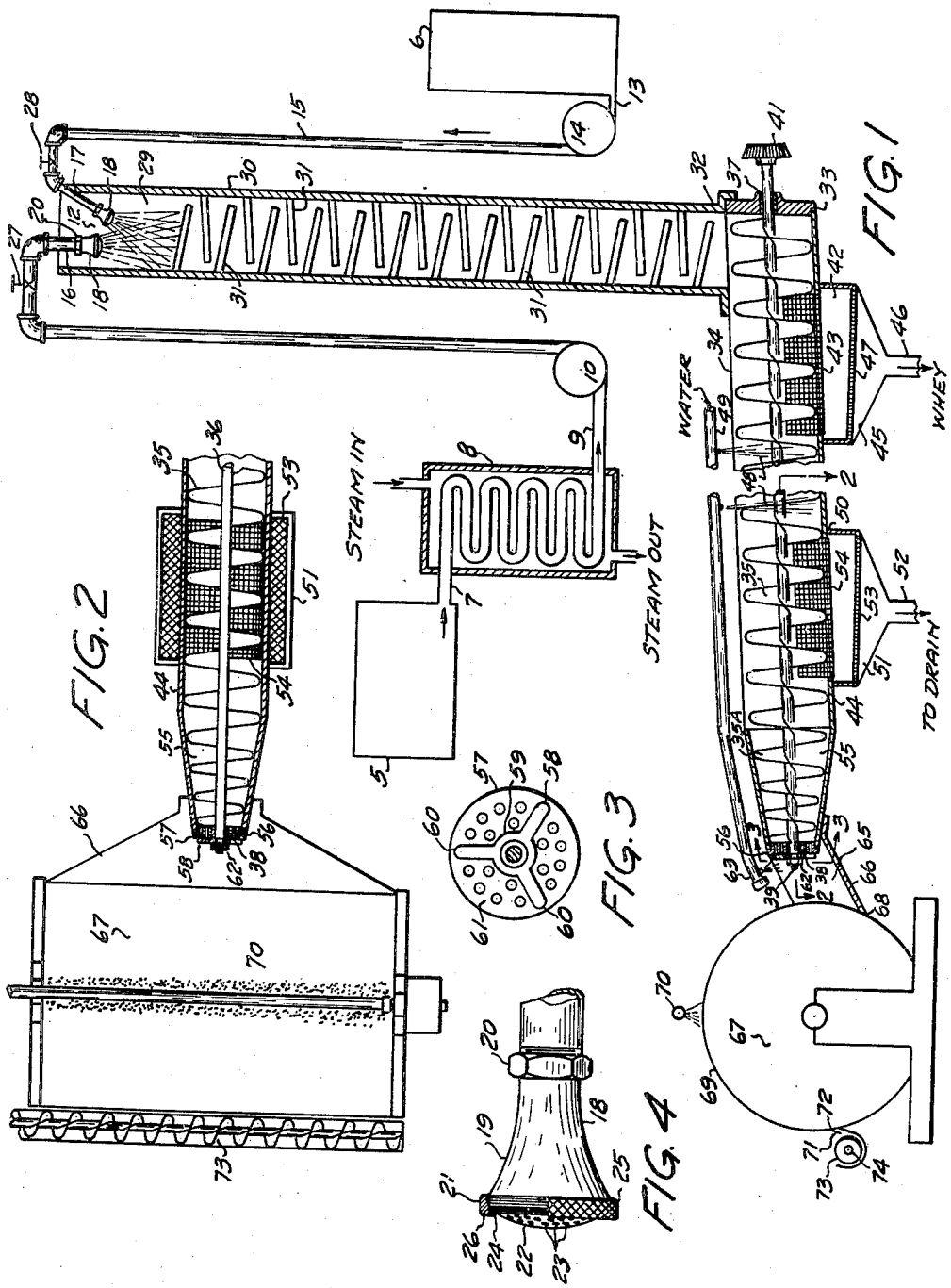
INVENTOR
LAWRENCE C. PAGEL
BY L. T. Lhotak
ATTORNEY Patented Dec. 19, 1939

2,184,002

UNITED STATES PATENT OFFICE 2,184,002

PROCESS FOR THE MANUFACTURE OF CASEIN

Lawrence C. Pagel, Madison, Wis.

Application August 29, 1938, Serial No. 227,320

5 Claims. (Cl. 260—120)

This invention relates to improvements in the process for the manufacture of casein.

The usual commercial method for making casein consists of mixing warm skim milk with a mineral acid. The quality of the casein is dependent upon the proper mixing of the acid and the milk and the suitable washing from the curd of all excess acid, whey and soluble salts.

In the known processes the mixture resulting from the combining of the acid and milk may be agitated up to the moment the curd is separated from the whey, or the curd may be bathed in its whey before the separation is effected. The agitating or bathing of the curd in its whey, provides for a further reaction of the free milk and acid particles remaining after the initial mixing thereof, and a consequent forming of an appreciable portion of the final curd precipitate. It is an object of the present invention to provide for an intimate and continuous mixing of an atomized spray of warm skim milk with an atomized spray of an acid, whereby to attain a substantially complete curd precipitation so as to eliminate the need for an agitating or a bathing of the curd in its whey, and hence the need for the additional apparatus required to effect these actions.

In the known processes for manufacturing casein a plurality of conveyors, arranged in series, are generally necessary to transfer the curd from the acid and warm milk mixing chamber, through the various whey and water separators and curd washers, to the curd drying machine. It is a further object of the present invention to provide a single screw conveyor which is adapted to transfer the curd from the mixing chamber to a drying means whereby to conserve the installation space, to eliminate the separate washing conveyors, to reduce the cost of the casein making apparatus and to reduce the time usually required to obtain a casein of high quality.

Further objects and advantages will appear from the following description taken in connection with the accompanying drawing:

Fig. 1 is a diagrammatic showing of the preferred apparatus for the making of casein; Fig. 2 is a sectional fragmentary view taken along the line 2—2 of Fig. 1; Fig. 3 is an enlarged sectional view taken along the line 3—3 of Fig. 1 showing the curd breaker assembly; and Fig. 4 is a view in perspective of an atomizing spray.

With reference to Fig. 1 of the drawing there is shown a tank 5 for skim milk and an acid tank 6. The milk from the tank 5 is taken through a pipe 7 to a pre-heater 8, where it is preferably heated to a temperature of about 120° F. The pre-heater does not form a part of the present invention and may be of any suitable commercial type such as a steam heater. The warm skim milk from the pre-heater is carried through a pipe 9 to a motor-operated pump 10 of centrifugal type, and thence discharged through a pipe 11 into a mixing chamber 12, in a manner to be hereinafter described. The acid in the tank 6, which may be hydrochloric or sulphuric acid, is conducted through a pipe 13 to a motor-operated centrifugal pump 14, which discharges the acid through a pipe 15 into the chamber 12. The ends 16 and 17 of the milk and acid lines 11 and 15, respectively, are provided with similar nozzles 18 of a type adapted to produce an atomized spray of the fluids passing therethrough.

The nozzles 18 (Fig. 4) may be of a commercial type having a body member 19, a universal coupling element 20 and an end assembly 21. The assembly 21 includes an outwardly, convexed disc 22 which is formed with a plurality of closely spaced apertures 23. The disc is positioned over the discharge end 24 of the spray by means of an annular, knurled nut 25, which threadedly engages the body end 24; the disc being locked between the end 24 and the shoulder 26 of the nut 25. The coupling element 20 provides for a ready removal and adjustment of the atomizing unit 18 and the nut 25 provides for a quick and easy cleaning of the disc 22. The milk and acid pumps 10 and 14, respectively, serve to effect a pressure on the fluids in the lines 11 and 15, respectively, so that the fluids passing through the nozzles 18 are atomized into fine, diverging, heavily-clouded sprays. The sprays are slantingly directed toward each other, as shown, to provide a very intimate, thorough and prolonged mixing of the acid and milk particles. There is thus attained, in the mixing chamber 12, a curd precipitation which is substantially 75% complete. The amount of acid to be thus mixed with the milk is dependent upon the acid concentration, but in every case sufficient acid is utilized to bring the casein to an iso-electric point which is at a pH of approximately 4.6. The quantities of the acid and milk to be mixed may be regulated by means of the control valves 27 and 28, which are positioned adjacent the nozzles 18 and in the lines 11 and 15, respectively. It is to be understood that the piping 11 and 15, pumps 10 and 14, and sprays 18 are formed of, or lined with, a material which is suitably resistant to the action of the fluids passing therethrough.

The chamber 12 is located in the top 29 of a baffle tower 30. The tower 30 is of a common type and includes a plurality of downwardly inclined baffles 31, which are alternately and oppositely arranged, as shown in Fig. 1, to provide a positive gravitational flow of the fluid mixture traveling therethrough. The curd and whey mixture formed in the chamber 12 flows through the baffle tower for a predetermined period of time sufficient to effect a complete and efficient mixing of any free milk and acid particles which were not united in the chamber 12, and to bring all of the curd to its proper iso-electric point. The time required for the gravitational flow of the curd and whey through the tower is dependent upon the height of the tower 30 and the inclination of the baffles 31. In the present invention it is preferred to construct the tower so as to require from five to eight minutes for the mixture to flow therethrough. It is to be noted that the baffle arrangement serves to hold the particles of curd in suspension in the whey, during the flow of the mixture through the tower, thus preventing an agglomeration of the curd with occluded whey therein. Also the length of time in which the curd is suspended in its whey is thus positively controlled whereby to assure a uniform concentration of acid in all portions of the curd. The curd is thus properly conditioned for the subsequent separating and washing treatments.

The bottom 32 of the tower 30 is suitably mounted near the upper end 33 of a screw conveyor 34. The conveyor includes a screw 35 of solid type which is suitably assembled about a shaft 36; the shaft being properly journalled in bearings 37 and 38, located at the conveyor ends 33 and 39, respectively. The shaft is provided at its end 40, with a gear 41, for connection to a suitable source of power, such as a motor (not shown). The curd and whey from the tower 30 drop directly into the upper end 33 of the conveyor 34 and are immediately taken by the screw 35 to a whey separator 42. The separator includes a strainer 43 which is removably secured to the conveyor casing 44 and is assembled as a part thereof. The strainer is of a length sufficient to permit all of the whey to be separated from the curd as the curd is being carried through the separator by the screw 35. It is to be understood that the speed of rotation of the screw is determined by the time required for the whey to be completely separated from the curd. It is preferred to have a separator about four or five feet long and the rotating speed of the shaft set to require from two to three minutes for the screw 35 to carry the mixture through the separator 42. The separated whey is collected in a suitable receptacle 45 which has an outlet drain 46. The collecting pan 45 is provided with a fine meshed screen 47 for catching any of the very small particles of curd which might pass through the strainer 43. The method of mixing the milk and acid, hereinabove described, and the immediate separation of the whey from the curd by the separator 42, provides for a minimum of over and under concentration of acid in any part of the curd and assures a large formation of curd precipitate of uniform quality.

The curd, from the separator 42, is then taken by the screw 35 into a washing section 48, of the conveyor 34. The section 48 is provided with a clear water spray 49 which is disposed above the open top of the conveyor casing 44 and functions to wash the curd of most of the soluble salts, whey and excess acid particles which were intermixed or formed therewith during the mixing action in the chamber 12 and tower 30. The curd, after being thoroughly washed, is passed through a water separator 50 which is similar to the whey separator 42, hereinbefore described, and which functions to separate the wash water from the curd. The separator 50 is also removably secured to and assembled as a part of the conveyor 34. The water, soluble salts, excess acid and whey thus separated, are collected in a pan 51 and drained to waste through a pipe 52; the pan being provided with a fine meshed screen 53 adapted to catch any curd particles which might pass through the strainer 54.

The substantially acid, whey and soluble salt free curd is then carried by the screw 35 into the funnel shaped section 55 of the conveyor 34. The section 55 converges toward the conveyor end 39; the small end 39 being provided with a curd breaker, generally designated as 56 (Figs. 1–3). The curd breaker 56 includes a fixed perforated disc 57, which is adapted to be positioned over and within the conveyor end 39, as shown. The screw portion 35A is formed to cooperate with the section 55 in a manner to force the curd through the perforations in the disc 57. A curd chopper 58 is suitably keyed to the shaft 36 and serves to break up the curd which is extruded through the perforated disc 57, by the squeezing action of the screw portion 35A. The chopper 58 consists of a hub 59 having integrally formed radially extending arms 60, which sweep across the outer face 61 of the disc 57 during the rotation of the shaft 36. The curd chopper 58 is maintained in operative position on the shaft 36 by a nut 62, which is threadedly secured and suitably locked to the shaft 36. A second clear water spray 63, which may be formed as a part of the spray 49, is located directly above the curd breaker 56 and functions to wash away any salt or acid particles which might have been occluded in the curd, before exposure by the extruding and breaking process.

It is to be noted that the gravitational flow of the curd and whey through the tower 30 and the cooperative operation of the solid screw shaft 36, and conveyor 34, serve to effect a positive and continuous forward movement of all the curd therethrough, so that the time required for the various process stages can be readily regulated to obtain a resultant casein of a desired and uniform quality.

The curd breaker extends into the upper portion 65 of a chute 66 through which the curd is dropped from the breaker to a filtering device 67, which may be of the usual commercial vacuum or centrifuge type. A continuous filter of the vacuum type is illustrated. The chute 66 is flared outward towards its end 68, which is adjacent to the filter, so as to have a width co-extensive with the axial length of the rotating filter-cylinder 69. The curd from the breaker 56 may be thus distributed over the entire length of the cylinder. As the cylinder rotates the curd is held to its peripheral surface, in a well known manner, by the vacuum action of the filter which action also functions to dewater the curd. While the curd is thus distributed over and held to the cylinder peripheral surface, it is subjected to a final washing by a clear water spray 70, which is suitably arranged axially of the cylinder 69. This water is also removed from the curd by the vacuum action of the filter, leaving the curd with a moisture content of about 50%. A well washed and substantially acid and salt free casein product is thus assured by these repeated clear water washing and dewatering operations. The casein is stripped from the cylinder by a scraper 71 which has an edge 72 in substantial adjacence to the cylinder periphery, as shown in Figs. 1 and 2. The casein is transferred directly from the scraper into a screw conveyor 73 which carries it to a suitable drying machine (not shown). The drying machine, by preference, operates to remove about 40% of the casein moisture content leaving a final moisture content of about 10%, before grinding and packing of the casein.

It is preferred, in the present invention, to have a conveyor about twenty feet long, with the shaft 36 rotating at a speed which will carry the curd through the screw conveyor 34 in a period of time of from ten to twelve minutes. The time required for the curd to pass through each of the separators 42 and 50, washing section 48 and curd breaker 56 being substantially the same, i. e., from two to three minutes. The speeds of rotation of the filtering cylinder 69 and the shaft 74 of the conveyor 73, are set in accordance with the speed of rotation of the shaft 36 of the conveyor 34, so that a continuous feed of the curd and casein through the apparatus will be obtained. It is preferred, therefore, to have the conveyors 34 and 73, and filter 67 operated by separate electrical motors (not shown), so that the necessary speed settings can be readily controlled and maintained.

It is to be noted that the conveyor 34 is inclined downwardly from the baffle tower 30 and that the chute 66 serves only to guide the curd in its substantially vertical drop from the curd breaker 56 to the filter 67. The effects of gravity are thus fully utilized in carrying the curd through the presently described casein manufacturing apparatus, thereby minimizing the power required to operate the screw 35 and to transfer the curd from the conveyor 34 to the filter 67. It is to be noted also that the whey and various wash waters are separated from the curd as soon as possible thereby effecting a reduction in the load carried by the screw and hence further reducing the power required to rotate the screw 35.

There is thus provided an apparatus for the manufacture of casein which is continuous, economical and efficient in operation and which requires but little space for its installation. The entire process is completed in a minimum of time, from twenty-five to thirty minutes, and provides for a casein of a uniform quality and a low ash content which is suitable for all applications of a self-soured manufactured casein.

It is to be understood that only the preferred embodiments of the invention are described and shown herein, and that alterations and modifications in the parts and arrangement thereof, may be effected without departing from the spirit and full intended scope of the invention, as defined by the claims appended hereto.

I claim:

1. The process of manufacturing casein, which consists in intimately and continuously mixing an atomized spray of warm skim milk with an atomized spray of a mineral acid, to obtain a fast and substantially complete curd precipitation, suspending the curd in its whey in a defined path of gravitational flow to obtain a curd of substantially uniform acid concentration, immediately separating the curd from its whey, washing the curd substantially free of all soluble salts, whey and excess acid in three separate wash waters and then dewatering the curd and drying the same.

2. The process of manufacturing casein, which consists in intimately and continuously mixing an atomized spray of warm skim milk with an atomized spray of a mineral acid, to obtain a fast and substantially complete curd precipitation, suspending the curd in its whey for a specific period of time to definitely control the acid concentration in all portions of said curd, immediately separating the curd from its whey, washing the curd substantially free of all soluble salts, whey and excess acid in three separate wash waters and then dewatering and drying the curd.

3. The process of manufacturing casein which consists in facing finely atomized sprays of an acid and a warm skim milk toward each other in a continuous and intimate contact to produce a substantially complete curd precipitation, suspending the curd in its whey for a defined period of time sufficient to bring all of the curd to an iso-electric point with a pH of approximately 4.6, separating the curd from its whey immediately after said curd suspending period, washing the curd substantially free of all soluble salts, excess acid and whey in three separate wash waters and then dewatering and drying the curd.

4. The process of manufacturing casein, which consists in intimately and continuously mixing an atomized spray of warm skim milk with an atomized spray of a mineral acid, to produce a substantially complete curd precipitation, suspending the curd in its whey for a specific period of time sufficient to effect a reaction of the free particles of milk and acid which might obtain in the said mixture, and to bring all of the curd to an iso-electric point with a pH of approximately 4.6, immediately separating the curd from its whey, washing the curd substantially free of all soluble salts, excess acid and whey in three separate wash waters and then dewatering and drying the curd.

5. The process of manufacturing casein, which consists in heating skim milk to a temperature not exceeding 120° F., in intimately and continuously mixing an atomized spray of said warm milk with an atomized spray of a mineral acid, to attain a curd precipitation which is substantially complete, suspending the curd in its whey for about eight minutes in a defined path of gravitational flow to control the acid concentration in all of said curd and to prevent agglomeration of the curd with occluded whey therein, immediately separating the curd from its whey, the said separation requiring about three minutes, washing the curd for a total of approximately ten minutes in three separate clear wash waters, dewatering the curd to approximately 50% of its moisture content, the said process requiring about twenty-five minutes, and then drying the curd.

LAWRENCE C. PAGEL.